US011701647B2

(12) United States Patent
Jeong et al.

(10) Patent No.: US 11,701,647 B2
(45) Date of Patent: Jul. 18, 2023

(54) CATALYST FOR PREPARING SYNTHETIC GAS, METHOD FOR PREPARING THE SAME, AND METHOD FOR PREPARING SYNTHETIC GAS USING THE SAME (71) Applicants: Hyundai Motor Company, Seoul (KR); Kia Motors Corporation, Seoul (KR); Research & Business Foundation Sungkyunkwan University, Gyeonggi-do (KR)

(72) Inventors: Haeun Jeong, Gyeonggi-do (KR); Jin Woo Choung, Gyeonggi-do (KR); Kyung Soo Park, Gyeonggi-do (KR); Jaehyeon Kwon, Gyeonggi-do (KR); Ji Su Yu, Gyeonggi-do (KR); Jong Wook Bae, Gyeonggi-do (KR)

(73) Assignees: Hyundai Motor Company, Seoul (KR); Kia Motors Corporation, Seoul (KR); Research & Business Foundation Sunskyunkwan University, Suwon (KR)

( * ) Notice: Subject to any disclaimer, the term of this patent is extended or adjusted under 35 U.S.C. 154(b) by 208 days.

(21) Appl. No.: 17/034,932

(22) Filed: Sep. 28, 2020

(65) Prior Publication Data
US 2022/0032281 A1 Feb. 3, 2022

(30) Foreign Application Priority Data

Jul. 28, 2020 (KR) .................. 10-2020-0093795

(51) Int. Cl.
*B01J 21/00* (2006.01)
*B01J 21/04* (2006.01)
(Continued)

(52) U.S. Cl.
CPC ......... *B01J 35/0013* (2013.01); *B01J 23/755* (2013.01); *B01J 35/006* (2013.01);
(Continued)

(58) Field of Classification Search
CPC ........ B01J 21/005; B01J 21/04; B01J 21/066; B01J 21/08; B01J 21/10; B01J 21/12;
(Continued)

(56) References Cited

U.S. PATENT DOCUMENTS 8,349,761 B2 * 1/2013 Xia ...................... B01J 37/0215
977/773
8,679,433 B2 * 3/2014 Yin .......................... B01J 23/63
502/67

(Continued)

FOREIGN PATENT DOCUMENTS

KR  10-2005-0051820    6/2005
KR  10-2010-0011687 A  2/2010

OTHER PUBLICATIONS

D. Liu et al., "Carbon dioxide reforming of methane over nickel-grafted SBA-15 and MCM-41 catalysts", Catalysis Today, vol. 148, pp. 243-250 (2009).

(Continued)

*Primary Examiner* — Cam N. Nguyen
(74) *Attorney, Agent, or Firm* — Fox Rothschild LLP (57) ABSTRACT

Disclosed are a catalyst for preparing a synthetic gas through dry reforming, a method preparing the catalyst, and a method using the catalyst for preparing the synthetic gas. The catalyst may include: a support including regularly distributed mesopores; metal nanoparticles supported on the support; and a metal oxide coating layer coated on a surface of the support.

9 Claims, 6 Drawing Sheets

(51) Int. Cl.
| | |
|---|---|
| *B01J 21/06* | (2006.01) |
| *B01J 21/08* | (2006.01) |
| *B01J 21/10* | (2006.01) |
| *B01J 21/12* | (2006.01) |
| *B01J 21/14* | (2006.01) |
| *B01J 23/00* | (2006.01) |
| *B01J 23/06* | (2006.01) |
| *B01J 23/08* | (2006.01) |
| *B01J 23/10* | (2006.01) |
| *B01J 23/28* | (2006.01) |
| *B01J 23/30* | (2006.01) |
| *B01J 23/40* | (2006.01) |
| *B01J 23/42* | (2006.01) |
| *B01J 23/44* | (2006.01) |
| *B01J 23/46* | (2006.01) |
| *B01J 23/50* | (2006.01) |
| *B01J 23/52* | (2006.01) |
| *B01J 23/60* | (2006.01) |
| *B01J 23/62* | (2006.01) |
| *B01J 23/63* | (2006.01) |
| *B01J 23/68* | (2006.01) |
| *B01J 23/72* | (2006.01) |
| *B01J 23/74* | (2006.01) |
| *B01J 23/75* | (2006.01) |
| *B01J 23/755* | (2006.01) |
| *B01J 23/80* | (2006.01) |
| *B01J 23/825* | (2006.01) |
| *B01J 23/83* | (2006.01) |
| *B01J 23/835* | (2006.01) |
| *B01J 23/88* | (2006.01) |
| *B01J 23/881* | (2006.01) |
| *B01J 23/882* | (2006.01) |
| *B01J 23/885* | (2006.01) |
| *B01J 23/887* | (2006.01) |
| *B01J 23/888* | (2006.01) |
| *B01J 23/89* | (2006.01) |
| *B01J 35/00* | (2006.01) |
| *B01J 35/10* | (2006.01) |
| *C01B 3/40* | (2006.01) |
| *B82Y 30/00* | (2011.01) |
| *B82Y 40/00* | (2011.01) |

(52) U.S. Cl.
CPC ............ *B01J 35/1061* (2013.01); *C01B 3/40* (2013.01); *B82Y 30/00* (2013.01); *B82Y 40/00* (2013.01)

(58) Field of Classification Search
CPC . B01J 21/14; B01J 23/005; B01J 23/06; B01J 23/08; B01J 23/10; B01J 23/28; B01J 23/30; B01J 23/40; B01J 23/42; B01J 23/44; B01J 23/46; B01J 23/50; B01J 23/52; B01J 23/60; B01J 23/626; B01J 23/63; B01J 23/6525; B01J 23/6527; B01J 23/686; B01J 23/687; B01J 23/72; B01J 23/74; B01J 23/745; B01J 23/75; B01J 23/755; B01J 23/80; B01J 23/825; B01J 23/83; B01J 23/835; B01J 23/88; B01J 23/881; B01J 23/882; B01J 23/885; B01J 23/8871; B01J 23/8873; B01J 23/8874; B01J 23/8875; B01J 23/888; B01J 23/8885; B01J 23/8906; B01J 23/8913; B01J 23/892; B01J 23/8926; B01J 23/894; B01J 23/8953; B01J 23/896; B01J 23/8966; B01J 23/8993; B01J 35/006; B01J 35/0013; B01J 35/1061; C01B 3/40; B82Y 30/00; B82Y 40/00
USPC ................ 502/240, 258–262, 300, 325, 327, 502/332–339, 349, 355, 415, 439
See application file for complete search history.

(56) References Cited

U.S. PATENT DOCUMENTS

| | | | | |
|---|---|---|---|---|
| 9,067,197 | B2 * | 6/2015 | Doering | B01J 21/063 |
| 9,403,150 | B2 * | 8/2016 | Lu | B01J 21/04 |
| 9,522,391 | B2 * | 12/2016 | Miyao | B01J 35/1061 |
| 9,694,351 | B1 * | 7/2017 | Roy | B01J 37/16 |
| 9,770,706 | B2 * | 9/2017 | Kartick | B01J 35/1038 |
| 9,855,549 | B2 * | 1/2018 | Gao | B01J 35/1009 |
| 9,896,628 | B2 * | 2/2018 | Rayo Mayoral | B01J 21/12 |
| 9,901,907 | B1 * | 2/2018 | Xiao | F01N 3/103 |
| 10,030,202 | B2 * | 7/2018 | Rayo Mayoral | B01J 21/12 |
| 10,280,283 | B2 * | 5/2019 | Rao | B01J 37/0211 |
| 10,427,137 | B2 * | 10/2019 | Kyriakidou | B01J 37/0207 |
| 10,675,586 | B2 * | 6/2020 | Goffe | B01J 23/22 |
| 10,695,749 | B2 * | 6/2020 | Xiao | B01J 23/60 |
| 10,894,760 | B2 * | 1/2021 | Vardon | B01J 35/1019 |
| 10,919,026 | B2 * | 2/2021 | Xiao | B01J 23/89 |
| 11,161,101 | B2 * | 11/2021 | Kato | B01J 23/464 |
| 11,426,717 | B2 * | 8/2022 | Moulton | B01J 23/75 |
| 2013/0172177 | A1 * | 7/2013 | Domke | B01J 37/16 |
| | | | | 502/262 |
| 2015/0140317 | A1 * | 5/2015 | Biberger | B01J 35/026 |
| | | | | 502/355 |
| 2018/0318763 | A1 * | 11/2018 | Biberger | B01D 53/9422 |
| 2019/0105638 | A1 * | 4/2019 | Lu | B01J 23/8913 |
| 2020/0094232 | A1 * | 3/2020 | Masuda | B01J 35/006 |
| 2020/0123018 | A1 * | 4/2020 | Jaroniec | B01J 23/72 |
| 2020/0188888 | A1 * | 6/2020 | Aruda | B01J 35/1047 |
| 2022/0023848 | A1 * | 1/2022 | Nakai | B01J 37/16 |
| 2022/0089436 | A1 * | 3/2022 | Jeong | B01J 35/023 |
| 2022/0212178 | A1 * | 7/2022 | Liu | B01J 35/1038 |
| 2022/0288568 | A1 * | 9/2022 | Fan | C01B 3/40 |

OTHER PUBLICATIONS

A. Tsoukalou et al., "Dry-reforming of methane over bimetallic Ni—M/La2O3 (M=Co, Fe): The effect of the rate of La2O2CO3 formation and phase stability on the catalytic activity and stability", Journal of Catalysis, (2006).

* cited by examiner

FIG. 1

Example 1
NP(10)/SBA-15@SiO$_2$

Example 2
NP(5)/SBA-15@SiO$_2$

Comparative Example 1
NP(10)/SBA-15

Comparative Example 2
NP(5)/SBA-15

FIG. 2

Example 1
NP(10)/SBA-15@SiO$_2$

Example 2
NP(5)/SBA-15@SiO$_2$

Comparative Example 1
NP(10)/SBA-15

Comparative Example 2
NP(5)/SBA-15

FIG. 3

Example 1, NP(10)/SBA-15@SiO$_2$
Fresh

FIG. 4

Example 1, NP(10)/SBA-15@SiO$_2$
Used

CATALYST FOR PREPARING SYNTHETIC GAS, METHOD FOR PREPARING THE SAME, AND METHOD FOR PREPARING SYNTHETIC GAS USING THE SAME

CROSS-REFERENCE TO RELATED APPLICATION

This application claims priority to and the benefit of Korean Patent Application No. 10-2020-0093795 filed in the Korean Intellectual Property Office on Jul. 28, 2020, the entire contents of which are incorporated herein by reference.

FIELD OF THE INVENTION

The present invention relates to a catalyst for preparing a synthetic gas, a method for preparing the same, and a method for preparing a synthetic gas using the same. The catalyst may improve aggregation and coke formation of active particles and may maintain activity without adding noble metals or additional enhancers.

BACKGROUND OF THE INVENTION

The rise in global temperature caused by greenhouse gases such as carbon dioxide ($CO_2$) has led to sea level rise, natural disasters, and ecosystem changes. Humans have developed technologies such as carbon capture and storage (CCS) and carbon capture and utilization (CCU) to reduce carbon dioxide emissions, but the CCS and the CCU have not solved essential problems of existing carbon dioxide emissions.

The carbon dioxide emissions are generated when most of energy and materials necessary for humanity to live, such as electricity, transportation, industry, and housing, are produced. Regulations to reduce $CO_2$ emissions, such as carbon emission reduction targets under the Paris Climate Agreement, rising carbon credit prices, achievement of zero net carbon emissions that is the EU Green Deal policy, and European Renewable Energy Directive 2 (RED2) regulations on $CO_2$ inclusion in fuel manufacturing processes have been strengthened worldwide.

As one of methods to reduce $CO_2$, hydrogen instead of energy that causes environmental pollution such as fossil fuels or nuclear power has been spotlighted as a clean energy carrier of the future. Hydrogen may be used for fuel cells in plant power generation and transportation. Currently, steam reforming (see Reaction Equation 1 below) has been commercialized as a method for producing hydrogen.

[Reaction Equation 1] Steam reforming of methane

For example, when 1 kg of hydrogen is produced according to the steam reforming, about 8 kg or greater of carbon dioxide is emitted, and as an alternative, when hydrogen is produced by using dry reforming (see Reaction Equation 2 below), an amount of carbon dioxide generated may be significantly reduced.

[Reaction Equation 2] Dry reforming of methane

Synthetic gas through the dry reforming may be produced as various compounds through the Fischer-Tropsch process. It may be used as a raw material for preparing dimethyl ether (DME), which may be used as an alternative fuel for diesel in the transportation field, and may also be used for preparing gasoline. When DME and gasoline are used as a low-carbon synthetic fuel instead of the current used fuel, $CO_2$ of several Gtons per year may be reduced.

The dry reforming is easy for subsequent processes (for example, Fischer-Tropsch reaction, oxygen containing compound synthesis) requiring a low $H_2$/CO ratio compared to the steam reforming. However, existing technologies undergo the reaction as in Reaction Equation 3 or Reaction Equation 4 below and cause deactivation due to severe carbon precipitation in a catalyst.

[Reaction Equation 3] Methane decomposition

$$CH_4 \rightarrow C(s)+2H_2$$

[Reaction Equation 4] Boudouard reaction $$2CO \leftrightarrow C(s)+CO_2$$

In addition, it is known that the reforming reaction undergoes Reaction Equation 3 to Reaction Equation 5 below. In particular, when the reverse reaction of Reaction Equation 4 and the reaction of Reaction Equation 5 are not actively performed, carbon is precipitated and grows at an active point of a catalyst to structurally collapse an active material and cause deactivation of the catalyst.

[Reaction Equation 5] Coke steam gasification

Therefore, since the dry reforming reaction is performed at a high temperature (700° C. to 1200° C.) capable of simultaneously converting thermodynamically stable methane and carbon dioxide while minimizing carbon precipitation, a catalyst that ensures heat resistance applicable to the high temperature and high conversion efficiency is required.

As a catalyst for a methane reforming reaction for preparing synthetic gas, a nickel-based catalyst has relatively high activity and thus is widely used, but has a great problem in catalyst durability due to rapid carbon precipitation and nickel aggregation. Meanwhile, when the noble metal platinum or rhodium is used as an active metal, deactivation of a catalyst is remarkably reduced, but there is an economically difficult aspect to use it in a commercial process requiring a large amount of catalyst.

The nickel-based catalyst is typically used by a method of dispersing nickel particles on a support such as $SiO_2$, $Al_2O_3$, $MgAl_2O_4$, $La_2O_3$, $CeO_2$, or $ZrO_2$. For the reforming reaction, studies of maintaining catalytic activity have been reported, e.g., by adding a small amount of various alkali and rare earth metal components (Na, K, La, Mg, Ce, Y, etc.) or other transition metal components (Co, Fe, Cu, etc.) as promoters, the catalyst stability problem due to carbon precipitation may be solved.

However, even in the case of the catalyst prepared through this method, activity decrease and carbon precipitation according to a high temperature aggregation phenomenon of nickel nanoparticles surface-dispersed as in a case of a general supported catalyst is accompanied, and for stability of the reaction, addition of an alkali promoter such as calcium is inevitable.

The above information disclosed in this Background section is only for enhancement of understanding of the background of the invention, and therefore it may contain information that does not form the prior art that is already known in this country to a person of ordinary skill in the art.

SUMMARY

In preferred aspects, provided are a catalyst for preparing a synthetic gas that may simultaneously convert main greenhouse gases carbon dioxide and methane to prepare a synthetic gas, and a method for preparing the catalyst. The catalyst may be applied to the Fischer-Tropsch reaction process by controlling a H$_2$/CO ratio of a prepared synthetic gas because it may be used for a dry reforming reaction, may improve aggregation and coke formation of active particles, which are a main problem of a reforming catalyst, and may maintain activity without adding a noble metal or additional promoter.

In another preferred aspect, provided is a method for preparing a synthetic gas using the catalyst.

In an aspect, provided is a catalyst for preparing synthetic gas, e.g., by dry reforming. The catalyst may include: a support including regularly distributed mesopores; metal nanoparticles supported on the support; and a metal oxide coating layer coated on a surface of the support.

The support may be a porous substrate or a porous material that includes plurality of shapes of pores (e.g., circular, or non-circular), holes, cavity (e.g., microcavity), labyrinth, channel or the like, whether formed uniformly or without regularity. Exemplary support may include pores (e.g., closed or open pores) within a predetermined size within a range from nanometer scale to sub-micrometer size, which is measured by maximum diameter of the pores. In particular, the pores are mesopores having the diameter between 2 nm and 50 nm according to International Union of Pure and Applied Chemistry (IUPAC) nomenclature, however, the size of the mesopores may fall in a range of 1 nm to 100 nm.

A term "nanoparticle" or "nanoparticles" as used herein refers to a particular or spherical substance that has a diameter of a predetermined size within a range from nanometer scale, which is measured by maximum distance of the particle. Exemplary nanoparticles preferably may have diameters ranges of about 1 to 999 nm, of about 1 to 900 nm, of about 1 to 800 nm, of about 1 to 700 nm, of about 1 to 600 nm, of about 1 to 500 nm, of about 1 to 400 nm, of about 1 to 300 nm, of about 1 to 200 nm, of about 1 to 100 nm, of about 1 to 50 nm, or about 1 to 20 nm, or 1 to 10 nm.

The support may suitably include one or more selected from the group consisting of poly(ethylene oxide)-poly(propylene oxide)-poly(ethylene oxide), polyethylene oxide (PEO), polypropylene oxide (PPO), SiO$_2$, Al$_2$O$_3$, MgO, MgAl$_2$O$_4$, La$_2$O$_3$, CeO$_2$, ZrO$_2$, SiC, an indium tin oxide (ITO), and a fluorine doped tin oxide (FTO).

The support may suitably include one or more selected from the group consisting of MCM-41, MCM-48, SBA-1, SBA-15, SBA-16, KIT-1, KIT-6, MSU-1, HMS, AMS-8, AMS-10, FDU-1, FDU-2, and FDU-12.

The metal nanoparticle may suitably include one or more selected from the group consisting of Ni, Fe, Cu, Co, Mo, Ru, Rh, Pd, Ag, Cd, Zn, Au, Pt, Ir, Os, W, and an oxide thereof.

A diameter of the metal nanoparticle may be about 10 nm or less.

The catalyst may include the metal nanoparticle in an amount of about 5 parts by weight to 15 parts by weight with respect to 100 parts by weight of the support.

The metal oxide coating layer may include one or more selected from the group consisting of SiO$_2$, Al$_2$O$_3$, MgO, MgAl$_2$O$_4$, La$_2$O$_3$, CeO$_2$, ZrO$_2$, SiC, an indium tin oxide (ITO), and a fluorine doped tin oxide (FTO).

The metal oxide coating layer may include mesopores having a diameter of about 2 nm to 50 nm.

The catalyst may include the metal oxide coating layer in an amount of 5 parts by weight to 15 parts by weight based on 100 parts by weight of the support.

In an aspect, provided is a method for preparing a catalyst for preparing synthetic gas, e.g., through dry reforming. The method may include: preparing a support including regularly distributed mesopores; supporting metal nanoparticles on the support; and forming a metal oxide coating layer on a surface of the support.

In the forming of the metal oxide coating layer, by using a nonionic, cationic, or anionic surfactant, the metal oxide coating layer may include mesopores having a diameter of about 2 nm to 50 nm.

Another embodiment of the present invention provides a method for preparing a synthetic gas, including, in the presence of the catalyst as described, performing a dry reforming reaction by injecting a reaction gas and heat-treating it.

The reaction gas may include one or more selected from the group consisting of a C1 to C20 alkane, a C1 to C20 alkene, a C1 to C20 alkyne, carbon dioxide, ammonia, HCO$_2$H, CH$_3$OH, and steam (H$_2$O).

The reaction gas may include methane and carbon dioxide, and the synthetic gas may include hydrogen and carbon monoxide.

The reaction gas may include the methane and the carbon dioxide in a molar ratio of about 1:1 to 1.2.

The reaction gas may be supplied at a flow rate of about 10,000 L/kgcat·h to 140,000 L/kgcat·h.

The dry reforming reaction may be performed at a pressure of about 0.5 atm to 20 atm and a temperature of about 650° C. to 850° C.

The catalyst for preparing the synthetic gas through the dry reforming of the present invention may simultaneously convert main greenhouse gases carbon dioxide and methane to prepare synthetic gas, may be applied to the Fischer-Tropsch reaction process by controlling a H$_2$/CO ratio of a prepared synthetic gas because it may be used for a dry reforming reaction, may improve aggregation and coke formation of active particles, which are a main problem of a reforming catalyst, and may maintain activity without adding a noble metal or additional promoter.

DETAILED DESCRIPTION

Advantages and features of the present invention and methods of accomplishing the same may be understood more readily by reference to the following detailed description of preferred embodiments and the accompanying drawings. However, this invention may be embodied in many different forms and is not to be construed as limited to the embodiments set forth herein. Unless otherwise defined, all terms (including technical and scientific terms) used herein have the same meaning as commonly understood by one of ordinary skill in the art. Further, it will be understood that terms such as those defined in commonly used dictionaries should be interpreted as having a meaning that is consistent with their meaning in the context of the relevant art and the present invention, and will not be interpreted in an idealized or overly formal sense unless expressly so defined herein.

In the present specification, unless explicitly described to the contrary, the word "comprise" and variations such as "comprises" or "comprising" will be understood to imply the inclusion of stated elements but not the exclusion of any other elements.

Further, as used herein, the singular forms "a", "an", and "the" are intended to include the plural forms as well, unless the context clearly indicates otherwise.

Unless otherwise indicated, all numbers, values, and/or expressions referring to quantities of ingredients, reaction conditions, polymer compositions, and formulations used herein are to be understood as modified in all instances by the term "about" as such numbers are inherently approximations that are reflective of, among other things, the various uncertainties of measurement encountered in obtaining such values.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

A catalyst for preparing a synthetic gas through dry reforming according to an exemplary embodiment of the present invention may include a support including regularly distributed mesopores, metal nanoparticles supported on the support, and a metal oxide coating layer coated on a surface of the support.

The support may include a porous support including an ordered mesoporous structure including regularly distributed mesopores. A mesopore diameter of the mesoporous structure may be about 1 nm to 30 nm, for example, 2 nm to 20 nm, or 5 nm to 10 nm. The ordered mesoporous structure highly disperses the metal nanoparticles, which are active materials, and provides a stable structure to the catalyst. When a mesopore size of the ordered mesoporous structure is greater than the predetermined range, e.g., greater than 30 nm, structural stability of the catalyst may be deteriorated, and when the mesopore size is less than the predetermined size, e.g., 1 nm, the metal nanoparticles as the active material may not be well supported in the mesopores of the ordered mesoporous structure.

As the ordered mesoporous structure has the mesopores, it may have a high specific surface area, and thus may support a large amount of active metal nanoparticles, and reaction gas supply to the supported metal nanoparticles and diffusion of products and by-products from the metal nanoparticles may be easily achieved.

Accordingly, a specific surface area of the ordered mesoporous structure may be greater than about 200 $m^2/g$, for example, may be of about 200 $m^2/g$ to 800 $m^2/g$. When the specific surface area of the ordered mesoporous structure is about 200 $m^2/g$ or less, an amount of metal nanoparticles that may be supported on the ordered mesoporous structure may be limited.

A pore volume of the ordered mesoporous structure may be greater than about 0.5 $cm^3/g$, for example, may be greater than about 0.5 $cm^3/g$ to 2.0 $cm^3/g$. When the pore volume of the ordered mesoporous structure is about 0.5 $cm^3/g$ or less, the metal nanoparticles may not be supported in the inside of the mesopores, and thus dispersibility thereof may be low.

The ordered mesoporous structure may include one or more selected from the group consisting of poly(ethylene oxide)-poly(propylene oxide)-poly(ethylene oxide) (e.g., pluronic P123), polyethylene oxide (PEO), polypropylene oxide (PPO), $SiO_2$, $Al_2O_3$, MgO, $MgAl_2O_4$, $La_2O_3$, $CeO_2$, $ZrO_2$, SiC, an indium tin oxide (ITO), and a fluorine doped tin oxide (FTO).

The ordered mesoporous structure includes frameworks that form a wall between the mesopores. The frameworks may be shapeless, may form a complex network, and may be connected to each other.

The ordered or regularly formed mesoporous structure may be in a form including various types of mesoporous molecular complex network sieve materials having structures in which one-dimensional mesopores are interconnected by micropores, and for example, it may include one or more selected from the group consisting of MCM-41, MCM-48, SBA-1, SBA-15, SBA-16, KIT-1, KIT-6, MSU-1, HMS, AMS-8, AMS-10, FDU-1, FDU-2, and FDU-12. The above-mentioned materials are molecular sieve materials having a three-dimensional connection structure, wherein MCM-48 has a cubic structure, SBA-1 has a different cubic structure, SBA-15 has a hexagonal-cubic structure, and KIT-1 or MSU-1 has a structure in which pores thereof are irregularly connected in three dimensions.

The metal nanoparticle as the active material may be supported on the pore and/or surface of the support.

The metal nanoparticle may include one or more selected from the group consisting of Ni, Fe, Cu, Co, Mo, Ru, Rh, Pd, Ag, Cd, Zn, Au, Pt, Ir, Os, W, and an oxide thereofa. An appropriate combination of these may improve the precipitation of carbon, but may be less economical when using a noble metal series.

A diameter of the metal nanoparticle may be of about 10 nm or less, for example, of about 6 nm or less, or of about 3 nm to 10 nm. As the diameter of the metal nanoparticle become less, the probability that the metal nanoparticle is located inside the mesopores of the support may increase, and the growth of a particle during the reaction may be prevented, and when it is greater than about 10 nm, the possibility of growth after carbon precipitation may increase.

The metal nanoparticle may be included at 5 parts by weight to 15 parts by weight with respect to 100 parts by weight of the support. When a content of the metal nanoparticles is less than about 5 parts by weight, a conversion rate of carbon dioxide and methane may decrease, and when it is greater than about 15 parts by weight, a lifespan of the catalyst may be reduced due to a coke formation reaction and a particle aggregation phenomenon.

The metal oxide coating layer may be located on the surface of the support. By the metal oxide coating layer, the metal nanoparticles may be prevented from agglomerating during particle growth and a synthetic gas preparation reaction by a space trapping effect between the support and the metal oxide coating layer.

The metal oxide coating layer may include one or more selected from the group consisting of $SiO_2$, $Al_2O_3$, MgO, $MgAl_2O_4$, $La_2O_3$, $CeO_2$, $ZrO_2$, SiC, an indium tin oxide (ITO), and a fluorine doped tin oxide (FTO).

The metal oxide coating layer may be included in an amount of about 5 parts by weight to 15 parts by weight, for example, about 9 parts by weight to 11 parts by weight, based on 100 parts by weight of the support. When a content of the metal oxide coating layer is less than about 5 parts by weight, an effect of the coating may not be sufficient and thus aggregation of the metal nanoparticles may increase, and when it is greater than about 15 parts by weight, the content of the metal nanoparticles may decrease and thus aggregation may increase.

In the synthetic gas preparation catalyst, the metal nanoparticles, which are the active materials, may be structurally well supported on the ordered mesoporous support, and aggregation between particles may be reduced by the metal oxide coating layer, thereby making it durable in carbon precipitation.

A method for preparing the catalyst for preparing the synthetic gas through the dry reforming according to an exemplary embodiment of the present invention includes: preparing an ordered mesoporous support including regularly distributed mesopores; supporting metal nanoparticles on the support; and forming a metal oxide coating layer on a surface of the support.

The ordered mesoporous support may be prepared by using various known methods. For example, SAB-15 may be synthesized by dissolving pluronic P123 in an aqueous solution to use it as an organic template material, performing hydrolysis and condensation reaction of tetraethyl orthosilicate (TEOS) by using an acid catalyst, and then performing hydrothermal synthetic.

The supporting of the metal nanoparticles may be performed by allowing a solution containing the metal nanoparticles to contact the support, bonding them through ultrasonic treatment, and then drying them.

The solution containing the metal nanoparticles may be prepared by adding the metal nanoparticles to a solvent, and the solvent may include one or more selected from the group consisting of distilled water, ethanol, methanol, ethylene glycol, propylene glycol, and isopropyl alcohol.

The drying may be performed at a temperature of about 60° C. to 90° C. When the drying temperature is less than about 60° C., not all of the solvent is removed, so the metal nanoparticles may flow out of the mesopores during a firing process, and when the drying temperature is greater than about 60° C., as the drying speed is fast, the metal nanoparticles may flow out of the mesopores during the drying as described above.

Meanwhile, an oxide of the metal nanoparticle may be generated when the catalyst is prepared. For example, in the process of preparing the catalyst for preparing the synthetic gas by bonding the metal nanoparticles to the support, drying them, and forming the metal oxide coating layer and then firing it, the metal nanoparticles may be partially reduced and oxidized, thus an oxide of the metal nanoparticle may be partially included in addition to the metal nanoparticle on the surface of the support.

The forming of the metal oxide coating layer may be performed by mixing the metal nanoparticle-supporting support and the metal oxide precursor, and firing them.

For example, after dispersing the prepared metal nanoparticle-supporting support in a solvent and then adding a surfactant (for example, cetyltrimethylammonium bromide (CTAB)) thereto, ultrasonic treatment may be performed to bond the surfactant to a surface of the metal nanoparticle-supporting support. Subsequently, a metal oxide precursor (for example, TEOS) may be injected and stirred to cause a coating reaction, and then firing may be performed to prepare a catalyst.

As such, by using the surfactant in the forming of the metal oxide coating layer, the metal oxide coating layer may be provided with mesopores having a diameter of about 2 nm to 50 nm. When the diameter of the mesopores of the metal oxide coating layer is greater than the predetermined range, e.g., greater than about 50 nm, the structural stability of the catalyst may be deteriorated, and when the diameter of the mesopores thereof is less than the predetermined range, e.g., less than about 2 nm, the proximity of the metal nanoparticle and the reaction gas may be deteriorated.

The surfactant may be a nonionic, cationic, or anionic surfactant in addition to cetyltrimethylammonium bromide, but the type thereof is not particularly limited.

The method of preparing the synthetic gas according to an exemplary embodiment of the present invention may be achieved by performing a dry reforming reaction by injecting and heat-treating a reaction gas in the presence of the catalyst for preparing the synthetic gas.

The reaction gas may include one or more selected from the group consisting of $C_1$ to $C_{20}$ alkane, a $C_1$ to $C_{20}$ alkene, a $C_1$ to $C_{20}$ alkyne, carbon dioxide, ammonia, $HCO_2H$, $CH_3OH$, and steam ($H_2O$). For example, the reaction gas may include methane and carbon dioxide, and in this case, the synthetic gas may include hydrogen and carbon monoxide.

In the method for preparing the synthetic gas, a molar ratio of the reaction gas is adjusted for obtaining a synthetic gas of a required composition. The reaction gas may include the methane and the carbon dioxide in a molar ratio of about 1:1 to 1.2. Meanwhile, in the case of the dry reforming, the reaction gas may further include nitrogen together with the methane and carbon dioxide.

When the molar ratio of the carbon dioxide is less than 1, the conversion rate of the methane may be decreased and the amount of carbon precipitation may be increased, and when it is greater than about 1.2, the conversion rate of the carbon dioxide may be decreased, and the amount of hydrogen prepared by oxidizing the surface of the metal nanoparticles, which are the active materials of the catalyst, may be decreased. When the molar ratio of the methane and the carbon dioxide is about 1:1 to 1.2, the ratio may be optimal, considering the conversion rate of the reaction gas, the ratio of $H_2$/CO in the prepared gas, and the amount of carbon precipitation.

The reaction gas may be supplied at a flow rate of about 10,000 L/kgcat·h to 140,000 L/kgcat·h (based on 50 mg of catalyst). The supply rate of the reaction gas may be increased in proportion to a size of a dry reforming reactor and an amount at which the catalyst is received.

A reaction temperature and pressure of the dry reforming may be appropriately adjusted according to a composition of a required synthetic gas. For example, the dry reforming reaction may be performed at a pressure of about 0.5 atm to 20 atm and a temperature of about 650° C. to 850° C.

According to the method for preparing the synthetic gas using the catalyst, the conversion rate of methane and/or carbon dioxide with respect to the reaction gas may be about 45 mol % to 95 mol %, and may be stable in carbon precipitation at a temperature of about 800° C. up to about 100 hours.

EXAMPLE

Hereinafter, specific embodiments of the present invention are described. However, the following described examples are only for illustrating the invention more specifically, and thus the scope of the invention should not be limited by these examples.

Preparation Example: Preparation of Catalyst

Example 1

1) Preparation of Nickel Nanoparticles

Nickel nanoparticles were prepared by using a weak reducing agent in a low temperature organic solvent in the following way.

5 mmol of nickel-acetylacetonate (Sigma-Aldrich, hereinafter referred to as Ni(acac)$_2$) was added to a solution of 30 mL of oleylamine (Sigma-Aldrich, 90%, hereinafter referred to as Oam) and 1.6 mL of oleic acid (Sigma-Aldrich, hereinafter referred to as Oac), nitrogen-bubbled, and then stirred. It was heated at a temperature of 110° C. to remove water vapor and oxygen for 1 hour. In this process, all of the nickel precursor dissolved to form a uniform green solution. Then, the solution is cooled to a temperature of 90° C., 4 mL of OAm in which 580 mg of borane tert-butylamine (Sigma-Aldrich, reducing agent, BTB) was dissolved was added, and the temperature of the solution which turned black was maintained for 1 hour. After the reaction was over, the solution was cooled, and 60 mL of ethanol was added to the solution at a temperature of about 50° C. or less to destabilize the generated nanoparticles in the reaction solvent. Then, the nanoparticles were separated from the reactants by centrifugation and washed. In the first centrifugation, they were separated from the reactants, and in the next two centrifugations, they were washed with ethanol, and after the last centrifugation, the separated nanoparticles were dispersed and stored in 40 mL of normal hexane (n-Hexane).

2) Preparation of Ordered Mesoporous Support (SBA-15)

2 g of a pluronic P123 copolymer (Sigma-Aldrich, poly (ethylene oxide)-poly(propylene oxide)-poly(ethylene oxide), hereinafter referred to as P123) was added to 15 g of distilled water and 60 g of a 2 M hydrochloric acid solution, and dissolved for a sufficient period of time while strongly stirring at room temperature to allow P123 in the solution to self-assemble. When all of P123 was dissolved and becomes a transparent solution, 4.25 g of tetraethyl orthosilicate (Sigma-Aldrich, hereinafter referred to as TEOS), which is a silica precursor, was rapidly added and stirred for 24 hours while maintaining a temperature of 35° C. The mixture was subjected to hydrothermal reaction in an oven at a temperature of 110° C. for 24 hours. The prepared product was filtered and washed with distilled water, dried sufficiently in a convection oven at a temperature of 80° C., and then calcined at a temperature of 550° C. for 6 hours at a heating rate of 1° C./min under an air atmosphere (specific surface area 650 m$^2$/g to 720 m$^2$/g).

3) Supporting Nickel Nanoparticle on Ordered Mesoporous Support

A concentration of the prepared nickel nanoparticles was checked through induction ion plasma spectroscopy (ICP-OES) to be adjusted for supporting a desired amount of nickel. To disperse the nickel nanoparticles on the support, the nickel nanoparticles were made to be 10 parts by weight based on 100 parts by weight of the support, and 3 g of the support was added to the dispersion solution of the nickel nanoparticles and subjected to ultrasonication for 1 hour. After stirring it for 1 hour by using a rotary evaporator, hexane was evaporated under a room temperature and vacuum condition, and dried in a convection oven at a temperature of 80° C. overnight to remove residual organic solvent.

4) Formation of Metal Oxide Coating Layer

A following method was used to coat a mesoporous silica material on the catalyst NP(10)/SBA-15 prepared above.

0.35 g of the prepared NP(10)/SBA-15 catalyst was ultrasonic-treated and dispersed in 9 mL of ethanol. A solution of 8 mL of ethanol and 0.6 mL of ammonia water (NH$_4$OH, Deoksan, 25% to 30%) in which 0.3 g of cetyltrimethylammonium bromide (Alfa-Aesar, 98%, hereinafter referred to as CTAB) was dissolved is added and then ultrasonic-treated for an additional 10 minutes to attach CTAB to the surface of the prepared catalyst. While the mixture was strongly stirred at room temperature, 1.5 mL of TEOS (Daejung Chemical, 98.5%) was injected at a rate of 48 mL/h by using a syringe pump and stirred for 5 hours to continue the coating reaction. It was filtered and washed with ethanol, then dried overnight in a convection oven at 80° C., and calcined for 2 hours at a temperature of 550° C. in an air atmosphere to prepare a catalyst, which is called NP(10)/SBA-15@SiO$_2$.

Example 2

The same process as in Example 1 was performed, but the concentration of the nickel nanoparticle dispersion solution is adjusted such that the Ni content of the nickel nanoparticles dispersed in hexane was about 5 parts by weight. The other catalyst preparation process was the same as in Example 1. The prepared catalyst is called NP(5)/SBA-15@SiO$_2$.

Comparative Example 1

The same process as in Example 1 was performed, but the metal oxide coating layer was not formed to prepare a catalyst. The prepared catalyst was called NP(10)/SBA-15.

Comparative Example 2

The same procedure as in Comparative Example 1 was performed, but the concentration of the nickel nanoparticle dispersion solution was adjusted such that the Ni content of the nickel nanoparticles dispersed in hexane was about 5 parts by weight. The prepared catalyst was called NP(5)/SBA-15.

Comparative Example 3

The Ni/SiO$_2$ catalyst without the ordered mesoporous structure was prepared through a general wet support method.

A nickel nitrate (Ni(NO$_3$)$_2$.6H$_2$O) as a nickel precursor was used to prepare a 100 mL aqueous solution so that nickel was 10 parts by weight based on 100 parts by weight of the support, and then 2 g of SiO$_2$ (Sigma-Aldrich, fumed silica, specific surface area 395 m$^2$/g) was dispersed in the solution through ultrasonic treatment and then stirred for 1 hour or more. Thereafter, the solvent was removed with a vacuum dryer, and calcined in air at a heating rate of 1° C./min for 30 minutes at a temperature of 450° C. and 2 hours at a temperature of 800° C. The prepared catalyst is called Ni(10)/SiO$_2$.

Experimental Example 1: Analysis of Surface Structure of Catalyst

To analyze the mesoporous structure and the surface structure of the coating catalyst thereof, a specific surface area and average pore size were analyzed by using TriStar 3020. After the pre-treatment process to remove moisture and a surface adsorbing material, nitrogen was adsorbed and desorbed at a temperature of −196° C., and an amount thereof was measured to determine a specific surface area of the catalyst and a physical value of pores. Table 1 shows measurement results of physical properties thereof.

TABLE 1

| Classification | Example 1 | Example 2 | Comparative Example 1 | Comparative Example 2 | Comparative Example 3 |
|---|---|---|---|---|---|
| Ni content (parts by weight) | 10 | 5 | 10 | 5 | 10 |
| Specific surface area (m$^2$/g) | 647 | 719 | 617 | 669 | 203 |
| Average pore size (nm) | 3.1 | 3.0 | 6.1 | 6.1 | 18.0 |

Example 3: Synthetic Gas Preparation

The dry reforming experiment using carbon dioxide and methane was performed in a ⅜ in. Inconel fixed layer reactor. 0.05 g of catalyst was filled therein to heat 5 vol % of H$_2$/N$_2$ gas before reaction at a temperature of 800° C. for 1 hour at a rate of 30 mL/min. The catalysts prepared in Comparative Examples 1 to 3 were reduced for 10 minutes, and the catalysts prepared in Examples 1 and 2 were reduced for 1 hour. Then, a reaction gas of a ratio of CH$_4$:CO$_2$:N$_2$ (internal standard material)=1:1:2 was injected at space velocity SV=120,000 L/Kg$_{cat}$·h at a normal pressure and reacted at a temperature of 800° C., 1 atm. The reaction was continuously performed for about 20 hours, and measurement results of CO$_2$ and CH$_4$ conversion rates and H$_2$/CO molar ratios were shown in Table 2 below.

TABLE 2

| Classification | Example 1 Beginning | Example 1 20 hours later | Example 2 Beginning | Example 2 20 hours later | Comparative Example 1 Beginning | Comparative Example 1 20 hours later | Comparative Example 2 Beginning | Comparative Example 2 20 hours later | Comparative Example 3 Beginning | Comparative Example 3 20 hours later |
|---|---|---|---|---|---|---|---|---|---|---|
| CH$_4$ conversion rate (%) | 89.5 | 83.2 | 77.3 | 73.5 | 81.2 | 66.9 | 67.6 | 55.0 | 42.3 | 5.8 |
| CO$_2$ conversion rate (%) | 93.1 | 89.2 | 86.0 | 83.1 | 89.6 | 79.6 | 82.4 | 72.3 | 56.3 | 12.2 |
| H$_2$/CO ratio | 0.95 | 0.91 | 0.88 | 0.86 | 0.89 | 0.82 | 0.86 | 0.80 | 0.73 | 0.22 |

As shown in Table 2, dry reforming activity was improved in the catalysts (Example 1, Example 2, Comparative Example 1, and Comparative Example 2) made of Ni nanoparticles compared to the typical SiO$_2$ support catalyst (Comparative Example 3). The catalyst prepared in Comparative Example 3 lost activity after 6 hours of reaction and was deactivated, but when supported on the ordered mesoporous structure SBA-15 (Comparative Example 1 and Comparative Example 2), the nickel particles were stably fixed and the conversion rate of the reaction gas and durability of the catalyst were improved. In addition, the catalysts prepared in Examples 1 and 2, in which the mesoporous silica coating layers were additionally formed in Comparative Examples 1 and 2, further improved the conversion rate and deactivation of the catalysts.

Experimental Example 2: Catalyst State Before and after Synthetic Gas Preparation (TEM)

The catalyst state before and after the synthetic gas preparation reaction of Example 3 was observed through a transmission electron microscope (TEM). The catalyst state before the synthetic gas preparation reaction is shown in FIG. 1, and the catalyst state after the synthetic gas preparation reaction is shown in FIG. 2.

In addition, in order to confirm the particle distribution before and after the synthetic gas preparation reaction of Example 3 of the catalyst prepared in Example 1 having the best activity among the prepared catalysts, scanning transmission electron microscope-energy dispersive spectroscopy (STEM-EDS) was performed. The catalytic element distribution images obtained before and after the synthetic gas preparation reaction of Example 3 are shown in FIG. 3 and FIG. 4.

Figure 1:
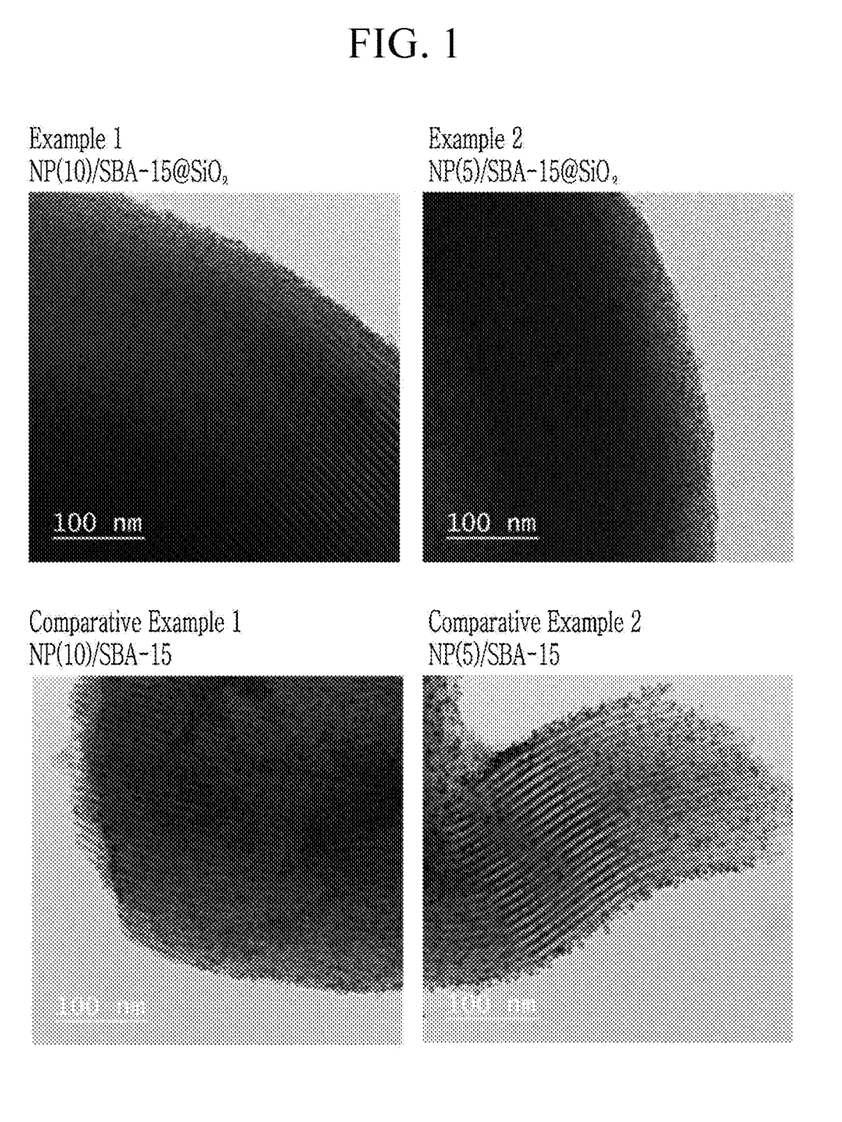
FIG. 1 shows a transmission electron microscope (TEM) photograph of an exemplary catalyst before a synthetic gas preparation reaction measured in Experimental Example 2.
Figure 2:
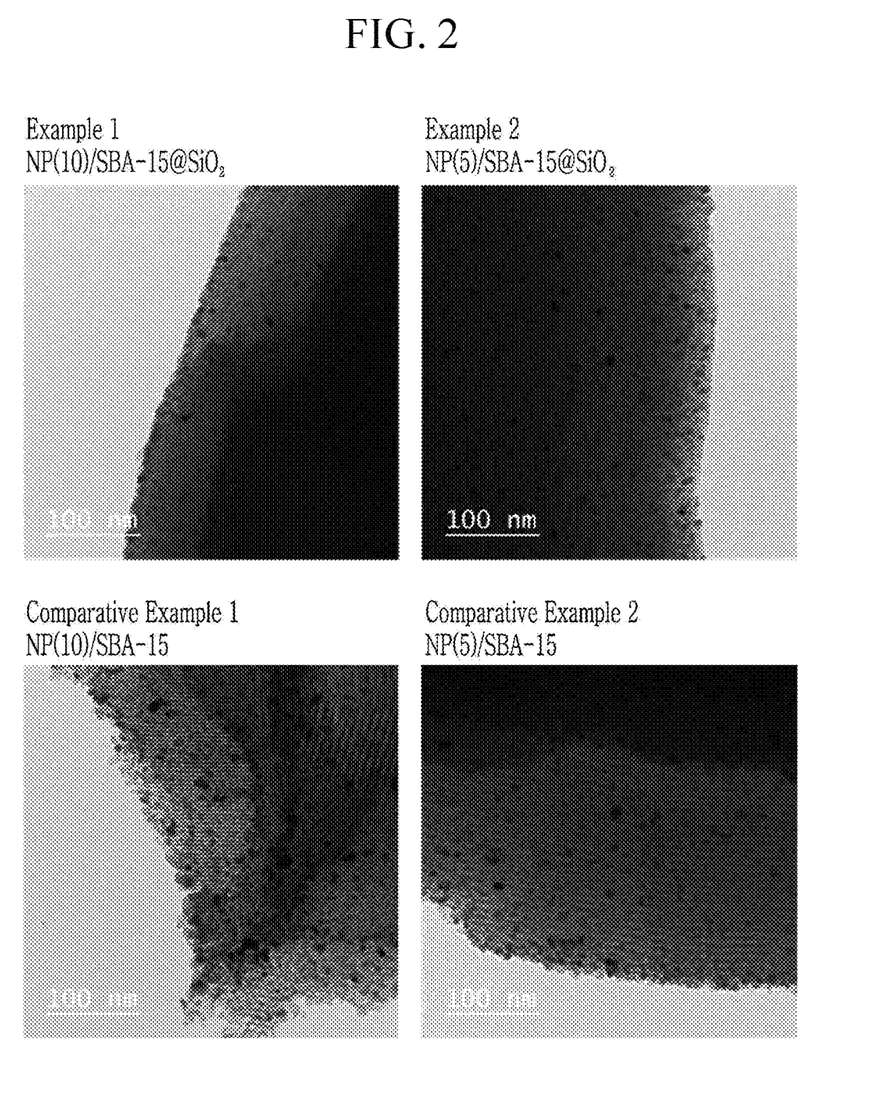
FIG. 2 shows a transmission electron microscope (TEM) photograph of an exemplary catalyst after a synthetic gas preparation reaction measured in Experimental Example 2.
Figure 3:
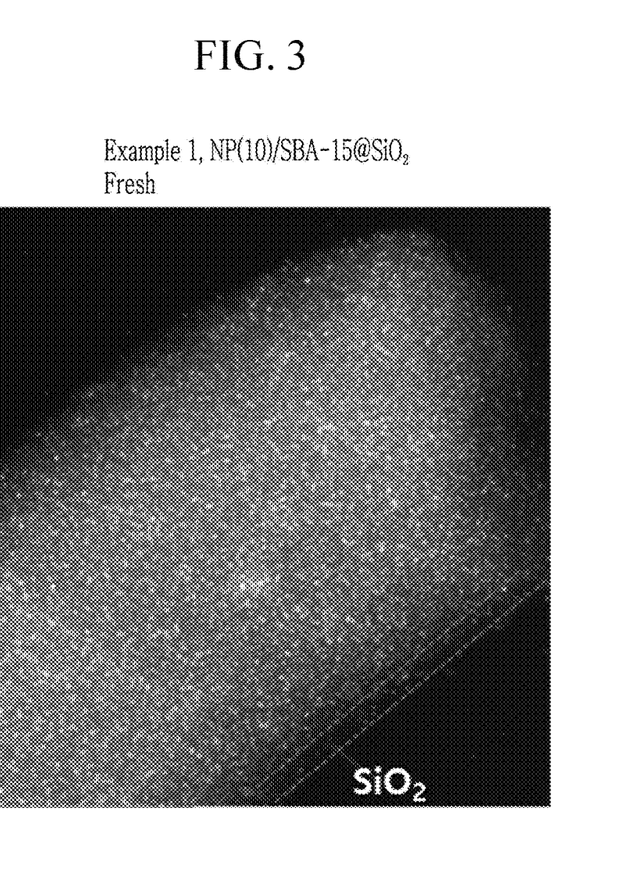
FIG. 3 shows a photograph of a result of scanning transmission electron microscope elemental analysis (STEM-EDS) of an exemplary catalyst before a synthetic gas preparation reaction measured in Experimental Example 2.

As shown in FIG. 1 and FIG. 3, when the catalysts prepared in Comparative Examples 1 and 2 and the catalysts prepared in Examples 1 and 2 were compared, particle agglomeration occurring in a coating catalyst in which nickel nanoparticles were trapped inside a thin mesoporous silica coating layer was improved.

Figure 4:
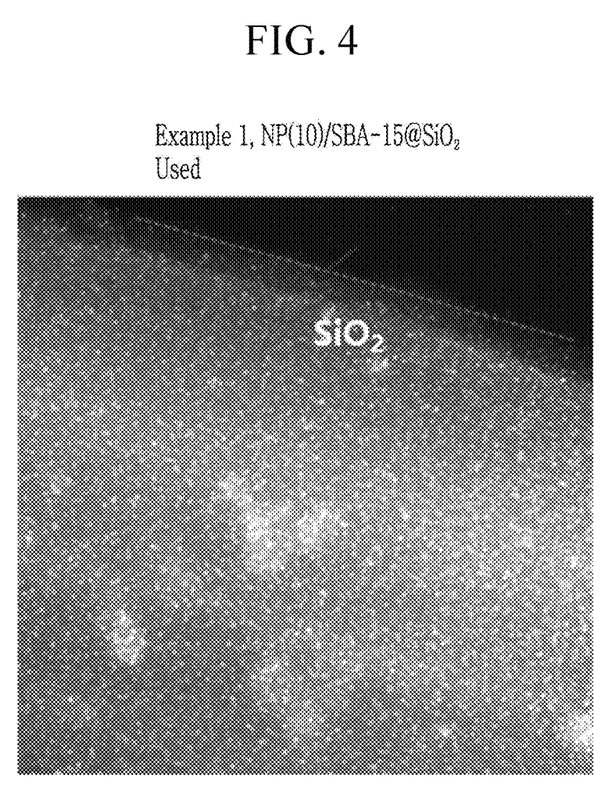
FIG. 4 shows a photograph of a result of scanning transmission electron microscope elemental analysis (STEM-EDS) of an exemplary catalyst after a synthetic gas preparation reaction measured in Experimental Example 2.

As shown in FIG. 3 and FIG. 4, a thin $SiO_2$ layer was formed on an edge of the catalyst particles, and after the reaction, aggregation of some Ni particles was confirmed, but from the Ni element distribution image that high dispersion was still maintained.

Experimental Example 3: Analysis of Carbon Precipitation Amount During Synthetic Gas Preparation (TGA)

After the synthetic gas preparation reaction of Example 3, a thermogravimetric analyzer (TGA) was used to analyze the carbon precipitation amount of the catalyst. A weight change of the catalyst was measured after the reaction according to the combustion of the precipitated carbon, and Table 3 shows the carbon precipitation amount calculated by defining a weight loss in the range of 200° C. to 315° C. as a soft coke that is well regenerated by being hydrogenated to $CH_4$; and the carbon precipitation amount calculated by defining a weight loss between 500° C. and 800° C. as a hard coke that is difficult to be regenerated from the catalyst.

TABLE 3

|  | Example 1 | | Example 2 | |
| --- | --- | --- | --- | --- |
|  | Soft coke | Hard coke | Soft coke | Hard coke |
| Carbon precipitation amount (wt %) | 0.18 | 0.21 | — | 0.06 |

|  | Comparative Example | | Comparative Example 2 | | Comparative Example 3 | |
| --- | --- | --- | --- | --- | --- | --- |
|  | Soft coke | Hard coke | Soft coke | Hard coke | Soft coke | Hard coke |
| Carbon precipitation amount (wt %) | 0.25 | 1.10 | — | 0.43 | 0.04 | 0.11 |

As shown in Table 3, in the case of the catalyst prepared in Comparative Example 3, the reaction hardly occurred, so the amount of coke was very small, and the amount of hard coke associated with the deactivation of the catalyst was smaller in Example 1 and Example 2 than in Comparative Example 1 and Comparative Example 2, which seemed to be because the Ni average particle size was kept small due to the coating effect of the catalyst. Generally, the amount of carbon precipitation (coke) of the catalyst was very small, and the cause of catalyst deactivation after 20 hours could be interpreted to be due to the Ni aggregation and the oxidation during the reaction rather than the carbon precipitation.

Experimental Example 4: Analysis of NiO Average Crystal Size Before and after Reaction (XRD)

An X-ray diffraction (XRD) pattern analysis was performed to analyze the average crystal size of the catalytic active species before and after the synthetic gas preparation reaction of Example 3. The results are shown in FIG. 5 and FIG. 6, respectively, and the calculated average crystal sizes are shown in Table 4.

TABLE 4

|  | NiO average crystal size (nm) | |
| --- | --- | --- |
| Classification | Fresh | Used |
| Example 1 | 5.2 | 10.1 |
| Example 2 | 2.7 | 6.7 |
| Comparative Example 1 | — | 14.9 |
| Comparative Example 2 | — | 9.0 |
| Comparative Example 3 | 14.2 | 16.3 |

Figure 5:
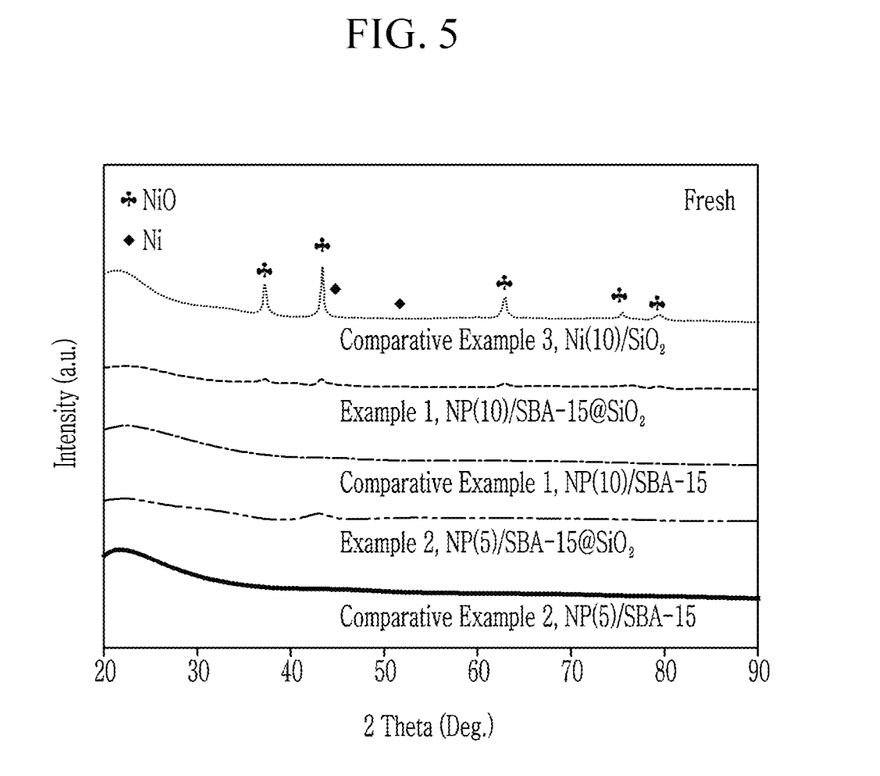
FIG. 5 shows a graph of a result of X-ray diffraction (XRD) pattern analysis of a catalyst before a synthetic gas preparation reaction measured in Experimental Example 4.
Figure 6:
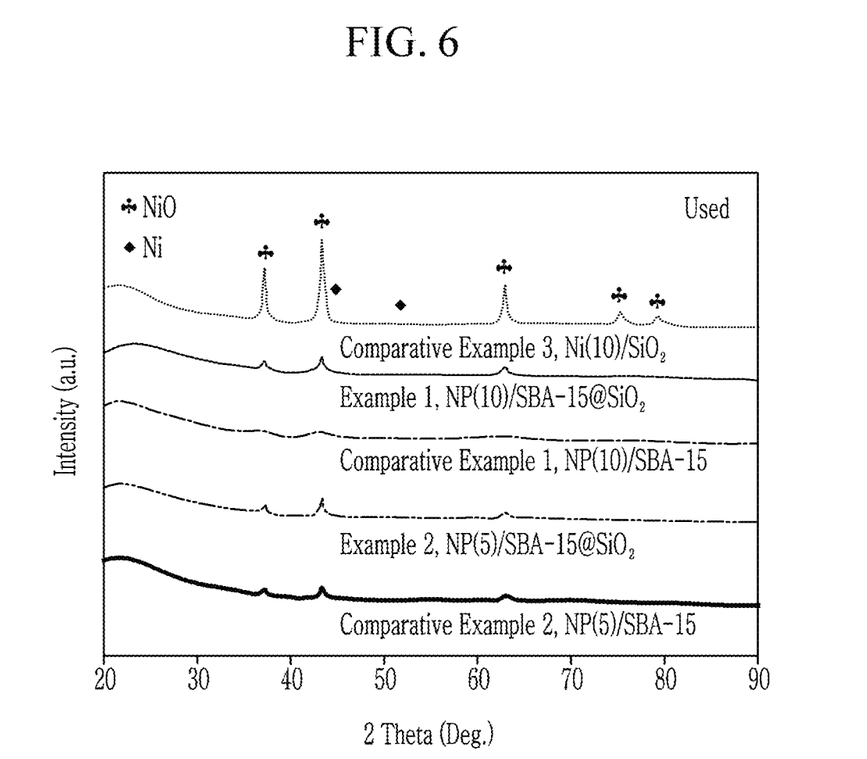
FIG. 6 shows a graph of a result of X-ray diffraction (XRD) pattern analysis of a catalyst after a synthetic gas preparation reaction measured in Experimental Example 4.

As shown in FIG. 5, FIG. 6, and Table 4, the NiO crystal size was maintained to be smaller in Comparative Example 1 and Comparative Example 2 using the mesoporous support material than in Comparative Example 3, and the NiO crystal size was reduced in Example 1 and Example 2 coated with $SiO_2$. Through this, it is possible to prevent aggregation between particles and oxidation of the catalytic active species Ni through the formation of the ordered mesoporous support and the metal oxide coating layer.

Example 4: Catalyst Long-Term Reaction Stability Test

The dry reforming reaction was performed in the same manner as in Example 3, but the reaction was continuously conducted for about 100 hours for a long-term durability test of the catalyst prepared in Example 1, which had the best activity. The measurement results of $CO_2$ and $CH_4$ conversion rates and $H_2$/CO molar ratio, and the results of carbon precipitation amount analyzed in the same manner as in Experimental Example 3, are shown in Table 5 below.

TABLE 5

|  | Example 1 | | Average deactivation rate (%/h) | Carbon precipitation amount | |
| --- | --- | --- | --- | --- | --- |
| Classification | Beginning | 100 hours later | | Soft coke amount (wt %) | Hard coke amount (wt %) |
| $CH_4$ conversion rate (%) | 87.5 | 82.5 | −0.05 | 0.16 | 0.41 |
| $CO_2$ conversion rate (%) | 89.5 | 86.6 | −0.03 | | |
| $H_2$/CO ratio | 0.99 | 0.97 | — | | |

As shown in Table 5, the catalyst prepared in Example 1 had stable reaction activity without serious deactivation during a long reaction of 100 hours, and after the reaction, the amount of carbon precipitation, which is difficult to be regenerated, was very low at within 0.5% by weight, so that the catalyst durability effect due to the mesoporous silica coating layer was obtained.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A catalyst for preparing a synthetic gas through dry reforming, consisting of:
   a SBA-15 support comprising regularly distributed mesopores;
   nickel (Ni) nanoparticles supported on the SBA-15 support; and
   a $SiO_2$ coating layer coated on a surface of the SBA-15 support and the $SiO_2$ coating layer comprising mesopores having a diameter of about 2 nm to 50 nm,
   wherein a diameter of the Ni nanoparticles is about 10 nm or less,
   wherein the catalyst comprises the Ni nanoparticles in an amount of about 5 parts by weight to 15 parts by weight based on 100 parts by weight of the SBA-15 support, and
   wherein the catalyst comprises the $SiO_2$ coating layer in an amount of about 5 parts by weight to 15 parts by weight based on 100 parts by weight of the SBA-15 support.

2. A method for preparing a synthetic gas, comprising performing a dry reforming reaction in the presence of the catalyst of claim 1 by injecting a reaction gas and heat-treating it.

3. The method of claim 2, wherein the reaction gas includes a C1 to C20 alkane, a C1 to C20 alkene, a C1 to C20 alkyne, carbon dioxide, ammonia, $HCO_2H$, $CH_3OH$, steam, or a combination thereof.

4. The method of claim 3, wherein the reaction gas comprises methane and carbon dioxide, and
   the synthetic gas comprises hydrogen and carbon monoxide.

5. The method of claim 4, wherein the reaction gas comprises the methane and the carbon dioxide in a molar ratio of about 1:1 to 1.2.

6. The method of claim 2, wherein the reaction gas is supplied at a flow rate of about 10,000 L/kgcat·h to 140,000 L/kgcat·h.

7. The method of claim 2, wherein the dry reforming reaction is performed at a pressure of about 0.5 atm to 20 atm and a temperature of about 650° C. to 850° C.

8. A method for preparing a catalyst used for preparing a synthetic gas through dry reforming, consisting of:
   preparing a SBA-15 support comprising regularly distributed mesopores;
   supporting nickel (Ni) nanoparticles on the SBA-15 support; and
   forming a $SiO_2$ coating layer on a surface of the SBA-15 support and the $SiO_2$ coating layer comprising mesopores having a diameter of about 2 nm to 50 nm,
   wherein a diameter of the Ni nanoparticles is about 10 nm or less,
   wherein the catalyst comprises the Ni nanoparticles in an amount of about 5 parts by weight to 15 parts by weight based on 100 parts by weight of the SBA-15 support, and
   wherein the catalyst comprises the $SiO_2$ coating layer in an amount of about 5 parts by weight to 15 parts by weight based on 100 parts by weight of the SBA-15 support.

9. The method of claim 8, wherein in the forming of the $SiO_2$ coating layer, by using a nonionic, cationic, or anionic surfactant, the $SiO_2$ coating layer comprises mesopores having a diameter of about 2 nm to 50 nm.

* * * * *